(12) United States Patent
Salsberg

(10) Patent No.: US 10,719,748 B2
(45) Date of Patent: Jul. 21, 2020

(54) RFID SCREW SPECIFICALLY FOR USE ON EYEGLASS FRAMES

(71) Applicant: Paul Salsberg, Toronto (CA)

(72) Inventor: Paul Salsberg, Toronto (CA)

( * ) Notice: Subject to any disclaimer, the term of this patent is extended or adjusted under 35 U.S.C. 154(b) by 0 days.

(21) Appl. No.: 16/276,238

(22) Filed: Feb. 14, 2019

(65) Prior Publication Data

US 2019/0266457 A1 Aug. 29, 2019

Related U.S. Application Data

(63) Continuation of application No. 62/636,806, filed on Feb. 28, 2018.

(51) Int. Cl.
*G06K 19/04* (2006.01)
*G06K 19/07* (2006.01)
*G06Q 10/08* (2012.01)

(52) U.S. Cl.
CPC ....... *G06K 19/041* (2013.01); *G06K 19/0723* (2013.01); *G06Q 10/087* (2013.01)

(58) Field of Classification Search
CPC . G06K 19/041; G06K 19/0723; G06Q 10/087
USPC ........................................ 235/385, 492, 493
See application file for complete search history.

(56) References Cited

U.S. PATENT DOCUMENTS

| | | | | |
|---|---|---|---|---|
| 5,367,346 A | 11/1994 | Branning | | |
| 6,239,737 B1* | 5/2001 | Black | ................ | G06K 19/041 342/44 |
| 7,256,697 B2* | 8/2007 | Sakama | ................ | G06K 19/04 340/572.1 |
| 7,365,686 B2* | 4/2008 | Sakama | ................ | H01Q 1/22 235/492 |
| 7,400,247 B2* | 7/2008 | Hopman | ................ | G06K 19/04 340/545.2 |
| 7,412,898 B1* | 8/2008 | Smith | ................ | G01L 5/24 73/761 |
| 8,094,848 B1* | 1/2012 | Frerking | ................ | H04R 25/505 381/312 |
| 8,310,367 B1* | 11/2012 | Vishwanath | ....... | G06K 19/0773 340/572.1 |
| 9,483,674 B1* | 11/2016 | Fink | ................ | G06K 7/10366 |
| 9,870,049 B2* | 1/2018 | Raffle | ................ | G06F 3/013 |
| 2006/0022056 A1* | 2/2006 | Sakama | ................ | G06K 19/04 235/492 |
| 2006/0027658 A1* | 2/2006 | Genc | ................ | G01S 13/825 235/454 |
| 2006/0187044 A1* | 8/2006 | Fabian | ................ | A61B 5/06 340/572.1 |
| 2009/0125072 A1* | 5/2009 | Neubardt | ........... | A61B 17/8625 606/305 |
| 2009/0155744 A1* | 6/2009 | Jandali | ................ | A61C 8/00 433/174 |
| 2010/0096455 A1* | 4/2010 | Binmore | ................ | G06K 7/0008 235/439 |

(Continued)

*Primary Examiner* — Paultep Savusdiphol

(57) ABSTRACT

The RFID tag of the embodiments of the present invention includes an integrated circuit for storing and processing information that modulates and demodulates radio-frequency (RF) signals, apparatus of collecting the AC power signal from an incident reader, and an antenna for receiving and transmitting the signal. The RFID tag information is stored in a non-volatile memory. The RFID tag includes either fixed or programmable logic for processing the transmission and sensor data, respectively.

5 Claims, 12 Drawing Sheets

(56) References Cited

U.S. PATENT DOCUMENTS

| | | | |
|---|---|---|---|
| 2011/0210135 A1* | 9/2011 | Huff | B65D 55/14 |
| | | | 220/780 |
| 2012/0119975 A1* | 5/2012 | Lee | H01Q 1/2208 |
| | | | 343/905 |
| 2012/0298758 A1* | 11/2012 | Vishwanath | G06K 19/0773 |
| | | | 235/492 |
| 2013/0140367 A1* | 6/2013 | Binmore | G06K 19/07758 |
| | | | 235/492 |
| 2014/0089243 A1* | 3/2014 | Oppenheimer | G06F 21/50 |
| | | | 706/46 |
| 2015/0262230 A1* | 9/2015 | Cypher | G06F 16/955 |
| | | | 705/14.49 |
| 2016/0126664 A1* | 5/2016 | Garcia | H01R 9/18 |
| | | | 439/310 |
| 2016/0148026 A1* | 5/2016 | Grimaux | G06K 7/0008 |
| | | | 340/10.1 |
| 2016/0250000 A1* | 9/2016 | Blair | A61B 90/98 |
| | | | 29/460 |
| 2017/0031435 A1* | 2/2017 | Raffle | G06F 3/013 |
| 2017/0262671 A1* | 9/2017 | Tiwari | G06K 7/10366 |
| 2018/0025193 A1* | 1/2018 | Grimaux | G06K 7/10425 |
| | | | 235/451 |
| 2018/0028275 A1* | 2/2018 | Bradley | A61C 8/00 |
| 2018/0157951 A1* | 6/2018 | Burgbacher | F42B 7/00 |
| 2019/0244071 A1* | 8/2019 | Grove | G06K 19/077 |

* cited by examiner

| AWG # | Diameter (inch) | Diameter (mm) | Area (kcmil) | Area (mm²) |
|---|---|---|---|---|
| 0000 (4/0) | 0.4600 | 11.6840 | 211.6000 | 107.2193 |
| 000 (3/0) | 0.4096 | 10.4049 | 167.8064 | 85.0288 |
| 00 (2/0) | 0.3648 | 9.2658 | 133.0765 | 67.4309 |
| 0 (1/0) | 0.3249 | 8.2515 | 105.5345 | 53.4751 |
| 1 | 0.2893 | 7.3481 | 83.6927 | 42.4077 |
| 2 | 0.2576 | 6.5437 | 66.3713 | 33.6308 |
| 3 | 0.2294 | 5.8273 | 52.6348 | 26.6705 |
| 4 | 0.2043 | 5.1894 | 41.7413 | 21.1506 |
| 5 | 0.1819 | 4.6213 | 33.1024 | 16.7732 |
| 6 | 0.1620 | 4.1154 | 26.2514 | 13.3018 |
| 7 | 0.1443 | 3.6649 | 20.8183 | 10.5488 |
| 8 | 0.1285 | 3.2636 | 16.5097 | 8.3656 |
| 9 | 0.1144 | 2.9064 | 13.0927 | 6.6342 |
| 10 | 0.1019 | 2.5882 | 10.3830 | 5.2612 |
| 11 | 0.0907 | 2.3048 | 8.2341 | 4.1723 |
| 12 | 0.0808 | 2.0525 | 6.5299 | 3.3088 |
| 13 | 0.0720 | 1.8278 | 5.1785 | 2.6240 |
| 14 | 0.0641 | 1.6277 | 4.1067 | 2.0809 |
| 15 | 0.0571 | 1.4495 | 3.2568 | 1.6502 |
| 16 | 0.0508 | 1.2908 | 2.5827 | 1.3087 |
| 17 | 0.0453 | 1.1495 | 2.0482 | 1.0378 |
| 18 | 0.0403 | 1.0237 | 1.6243 | 0.8230 |
| 19 | 0.0359 | 0.9116 | 1.2881 | 0.6527 |
| 20 | 0.0320 | 0.8118 | 1.0215 | 0.5176 |
| 21 | 0.0285 | 0.7229 | 0.8101 | 0.4105 |
| 22 | 0.0253 | 0.6438 | 0.6424 | 0.3255 |
| 23 | 0.0226 | 0.5733 | 0.5095 | 0.2582 |
| 24 | 0.0201 | 0.5106 | 0.4040 | 0.2047 |
| 25 | 0.0179 | 0.4547 | 0.3204 | 0.1624 |
| 26 | 0.0159 | 0.4049 | 0.2541 | 0.1288 |
| 27 | 0.0142 | 0.3606 | 0.2015 | 0.1021 |
| 28 | 0.0126 | 0.3211 | 0.1598 | 0.0810 |
| 29 | 0.0113 | 0.2859 | 0.1267 | 0.0642 |
| 30 | 0.0100 | 0.2546 | 0.1005 | 0.0509 |
| 31 | 0.0089 | 0.2268 | 0.0797 | 0.0404 |
| 32 | 0.0080 | 0.2019 | 0.0632 | 0.0320 |
| 33 | 0.0071 | 0.1798 | 0.0501 | 0.0254 |
| 34 | 0.0063 | 0.1601 | 0.0398 | 0.0201 |
| 35 | 0.0056 | 0.1426 | 0.0315 | 0.0160 |
| 36 | 0.0050 | 0.1270 | 0.0250 | 0.0127 |
| 37 | 0.0045 | 0.1131 | 0.0198 | 0.0100 |
| 38 | 0.0040 | 0.1007 | 0.0157 | 0.0080 |
| 39 | 0.0035 | 0.0897 | 0.0125 | 0.0063 |
| 40 | 0.0031 | 0.0799 | 0.0099 | 0.0050 |

FIG. 12

RFID SCREW SPECIFICALLY FOR USE ON EYEGLASS FRAMES

CROSS REFERENCE TO RELATED APPLICATIONS

The instant non-provisional patent application claims priority from provisional patent application No. 62/636,806, filed on 28 Feb. 2018, entitled RFID SCREW SPECIFICALLY FOR USE ON EYEGLASS FRAMES, and incorporated herein in its entirety by reference thereto.

BACKGROUND OF THE INVENTION

Field of the Invention

The embodiments of the present invention relate to a RFID screw, and more particularly, the embodiments of the present invention relate to a RFID screw specifically for use on eyeglass frames.

Description of the Prior Art

General

Radio-frequency identification (RFID) uses electromagnetic fields to automatically identify and track tags attached to objects. The tags contain electronically-stored information. Passive tags collect energy from nearby RFID reader's interrogating radio waves. Active tags have a local power source, such as, a battery, and may operate hundreds of meters from the RFID reader. Unlike a barcode, the tag need not be within the line of sight of the reader, so it may be embedded in the tracked object. RFID is one method for Automatic Identification and Data Capture (AIDC).

RFID tags are used in many industries, for example, an RFID tag attached to an automobile during production can be used to track its progress through the assembly line. RFID-tagged pharmaceuticals can be tracked through warehouses. And, implanting RFID microchips in livestock and pets allows for positive identification of animals.

Since RFID tags can be attached to cash, clothing, and possessions, or implanted in animals and people, the possibility of reading personally-linked information without consent has raised serious privacy concerns. These concerns resulted in standard-specifications-development addressing privacy and security issues. ISO/IEC 18000 and ISO/IEC 29167 use on-chip cryptography methods for traceability, tag and reader authentication, and over-the-air privacy. ISO/IEC 20248 specifies a digital signature data structure for RFID and barcodes providing data, source, and read method authenticity. This work is done within ISO/IEC JTC 1/SC 31 Automatic identification and data capture techniques. Tags can also be used in shops to expedite checkout, and to prevent theft by customers and employees.

Tags

A radio-frequency identification system uses tags or labels attached to the objects to be identified. Two-way radio transmitter-receivers called interrogators or readers send a signal to the tag and read its response.

RFID tags can be either passive, active, or battery-assisted passive. An active tag has an on-board battery and periodically transmits its ID signal. A battery-assisted passive (BAP) has a small battery on board and is activated when in the presence of an RFID reader. A passive tag is cheaper and smaller because it has no battery. Instead, the tag uses the radio energy transmitted by the reader. To operate a passive tag, however, it must be illuminated with a power level roughly a thousand times stronger than for signal transmission. That makes a difference in interference and in exposure to radiation.

Tags may either be read-only, having a factory-assigned serial number that is used as a key into a database, or may be read/write, where object-specific data can be written into the tag by the system user. Field programmable tags may be write-once and read-multiple. "Blank" tags may be written with an electronic product code by the user.

RFID tags contain at least three parts: an integrated circuit for storing and processing information that modulates and demodulates radio-frequency (RF) signals; means for collecting the AC power from the incident reader signal; and an antenna for receiving and transmitting the signal. The tag information is stored in a non-volatile memory. The RFID tag includes either fixed or programmable logic for processing the transmission and sensor data, respectively.

An RFID reader transmits an encoded radio signal to interrogate the tag. The RFID tag receives the message and then responds with its identification and other information. This may be only a unique tag serial number, or may be product-related information, such as, a stock number, a lot or batch number, a production date, or other specific information. Since tags have individual serial numbers, the RFID system design can discriminate among several tags that might be within the range of the RFID reader, and read them simultaneously.

Examples of prior art RFID tags 10 and 12 can be seen in FIGS. 1 and 2, respectively.

The common sizes of screws in mm include at least:
1.4×4.0×2.0 1.4×4.0×1.8 1.2×4.0×1.8 1.5×4.0×2.0 1.4×4.8×2.0
1.5×4.0×1.8 1.3×4.0×1.8 1.5×4.0×2.5 1.4×4.8×2.5 1.4×4.0×2.5

Readers

RFID systems can be classified by the type of tag and reader. A Passive Reader Active Tag (PRAT) system has a passive reader that only receives radio signals from active tags—battery operated, transmit only. The reception range of a PRAT system reader can be adjusted from 1-2,000 feet (0-600 m), allowing flexibility in applications, such as, asset protection and supervision.

An Active Reader Passive Tag (ARPT) system has an active reader that transmits interrogator signals and also receives authentication replies from passive tags.

An Active Reader Active Tag (ARAT) system uses active tags awoken with an interrogator signal from the active reader. A variation of this system could also use a Battery-Assisted Passive (BAP) tag which acts like a passive tag, but has a small battery to power the tag's return reporting signal.

Fixed readers are set up to create a specific interrogation zone that can be tightly controlled. This allows a highly defined reading area for when tags go in and out of the interrogation zone. Mobile readers may be hand-held or mounted on carts or vehicles.

Signaling

Signaling between the reader and the tag is done in several different incompatible ways, depending on the frequency band used by the tag. Tags operating on LF and HF bands are, in terms of radio wavelength, very close to the reader antenna because they are only a small percentage of a wavelength away. In this near field region, the tag is closely coupled electrically with the transmitter in the reader. The tag can modulate the field produced by the reader by changing the electrical loading the tag represents. By switching between lower and higher relative loads, the tag produces a change that the reader can detect. At UHF and higher frequencies, the tag is more than one radio wavelength away from the reader, requiring a different approach. The tag can backscatter a signal. Active tags may contain functionally separated transmitters and receivers, and the tag need not respond on a frequency related to the reader's interrogation signal.

An Electronic Product Code (EPC) is one common type of data stored in a tag. When written into the tag by an RFID printer, the tag contains a 96-bit string of data. The first eight bits are a header that identifies the version of the protocol. The next 28 bits identify the organization that manages the data for this tag. The organization number is assigned by the EPC Global consortium. The next 24 bits are an object class, identifying the kind of product. The last 36 bits are a unique serial number for a particular tag. These last two fields are set by the organization that issued the tag. Rather like a URL, the total electronic product code number can be used as a key into a global database to uniquely identify a particular product.

Often more than one tag will respond to a tag reader. For example, many individual products with tags may be shipped in a common box or on a common pallet. Collision detection is important to allow reading of data. Two different types of protocols are used to "singulate" a particular tag, allowing its data to be read in the midst of many similar tags. In a slotted Aloha system, the reader broadcasts an initialization command and a parameter that the tags individually use to pseudo-randomly delay their responses. When using an "adaptive binary tree" protocol, the reader sends an initialization symbol and then transmits one bit of ID data at a time. Only tags with matching bits respond, and eventually only one tag matches the complete ID string.

An example of a binary tree method of identifying an RFID tag 14 is shown in FIG. 3.

Both methods have drawbacks when used with many tags or with multiple overlapping readers. Bulk reading is a strategy for interrogating multiple tags at the same time, but lacks sufficient precision for inventory control.

And Most Importantly—Miniaturization

RFIDs are easy to conceal or incorporate in other items. For example, in 2009 researchers at Bristol University successfully glued RFID micro-transponders to live ants in order to study their behavior. This trend towards increasingly miniaturized RFIDs is likely to continue as technology advances.

Hitachi holds the record for the smallest RFID chip, at 0.05 mm×0.05 mm. This is 1/64th the size of the previous record holder, the mu-chip. Manufacture is enabled by using the silicon-on-insulator (SOI) process. These dust-sized chips can store 38-digit numbers using 128-bit Read Only Memory (ROM). A major challenge is the attachment of antennas, thus limiting read range to only millimeters.

Numerous innovations for RFID devices have been provided in the prior art, which are adapted to be used, and which are discussed, infra, in chronological order to show advancement in the art. Furthermore, even though these innovations may be suitable for the specific individual purposes to which they address, they would not be suitable for the purposes of the embodiments of the present invention as heretofore described, namely, an RFID screw specifically for use on eyeglass frames.

European Patent Application Publication Number EP0535919 to Ryan

European Patent Application Publication Number EP0535919—published to Ryan on Apr. 7, 1993 in Int. Class G06K and subclass 7/08—teaches a method for identifying a penetrable member, such as, a rail-road tie, utility pole, pallet, standing tree, or the like. A passive or active-transponder is encoded with identification information and placed within an accommodating receptacle in a nail, screw, bolt, or small fastener. The fastener is inserted into the penetrable member by use of a nail gun, drill, hammer, or other suitable device. Identification information stored in the transponder is read after insertion to identify the penetrable member.

United States Patent Application Publication Number 2004/0227219 to Su

United States Patent Application Publication Number 2004/0227219—published to Su on Nov. 18, 2004 in U.S. Class 257 and subclass 679—teaches an intelligent tag for glasses, which is composed of a chip, a coil, and a printed circuit board. The intelligent tag is joined to, or embedded to, the glasses. The chip is provided with an internal memory and is recorded with digital data that is encoded from messages with regard to a company making the glasses and personal data of a wearer of the glasses by way of wireless-induction-burning-technique. The digital data can be read out and decoded with a reader by way of wireless accessing, and the decoded messages can be sent to a personal computer for further use.

United States Patent Application Publication Number 2009/0078762 to Forster

United States Patent Application Publication Number 2009/0078762—published to Forster on Mar. 26, 2009 in U.S. Class 235 and subclass 385—teaches an attachable RFID tag having a containment head portion containing a passive RFID transponder and an attachment portion including an elongate projection extending therefrom. The projection is discontinuously threaded, with a screw-threaded portion and an unthreaded portion of longitudinal extent greater than the thickness of the item to be tagged. A tagging system, a method of tagging, and of operating a tagging system are also taught.

U.S. Pat. No. 7,651,217 to Welchel et al.

U.S. Pat. No. 7,651,217—issued to Welchel et al. on Jan. 26, 2010 in U.S. class 351 and subclass 115—teaches eyewear having a fit that may be used for safety, sports, and the like. The eyewear may provide features that permit enhanced airflow and an enhanced fit to a user's face. These features may include greater adjustability to provide greater comfort. Eyewear including an RFID tag is activated to send or receive transmissions when the eyewear is unfolded and/or positioned in a position to be worn by a user.

U.S. Pat. No. 8,035,518 to Kolton et al.

U.S. Pat. No. 8,035,518—issued to Kolton et al. on Oct. 11, 2011 in U.S. Class 340 and subclass 572.1—teaches an electronic tag housing that secures an electronic tag to an elongate article. The housing includes a cover and a base positioned over the cover for supporting the tag therebetween. The cover and base define a passageway therebetween for insertable receipt of the elongate article. A pressure plate is movably secured to the cover. The pressure plate is movable into engagement with the elongate article to clamp the article therein.

Chinese Patent Publication Number CN10737389 to Wa

Chinese Patent Publication Number CN10737389—published to Wa on Sep. 30, 2015 in International class F16B15 and subclass 00—teaches an RF tag function, attaining nails, belongs to the field of electronics. The system includes: a set in the side of the nail shank as the main structure; a cavity wall is provided with a non-enclosed area provided in the section nail pole cavity. The cavity is provided in the nail with radio frequency identification RFID firmware functions; unclosed regions disposed on the nail cavity for supporting the sheet staple fill packing body cavities; RFID using the nail in the magnetic field range and disposed in the interior of the system firmware RFID radio signal can be issued. The user can use the reader for its non-contact automatic identification and access to relevant data. Thus, the user can in a harsh environment identify the object, and object statistics. Thereby reducing the people of the target object management cumbersomeness. With this recognition, user-friendly management of logistics is taught.

It is apparent that numerous innovations for RFID devices have been provided in the prior art that are adapted to be used. Furthermore, even though these innovations may be suitable for the specific individual purposes to which they address, however, they would not be suitable for the purposes of the embodiments of the present invention as heretofore described, namely, an RFID screw specifically for use on eyeglass frames.

SUMMARY OF THE INVENTION

Thus, an object of the embodiments of the present invention is to provide a RFID screw specifically for use on eyeglass frames, which avoids the disadvantages of the prior art.

Another object of the embodiments of the present invention is for screws only related to eyeglass frames and nothing else.

Briefly stated, still another object of the embodiments of the present invention is to provide an RFID system having two parts—electronic devices called readers that send out radio signals, and label-like tags with a small amount of information in them.

Yet still another object of the embodiments of the present invention is that when the reader's radio signal hits the tag; the tag reflects back a signal with its serial number. In this way, the reader can identify all the tags within a short distance—usually a few meters.

Still yet another object of the embodiments of the present invention is in addition to being able to identify and count all of the tags in vicinity, the reader can estimate the location of the tag. It is used for internal retailer inventory, theft protection, and external inventory that relays the purchase back to the manufacturer or distributor for sales updates in real time.

Yet still another object of the embodiments of the present invention is to use it in the retail eyeglass frame sector, for example, where it counts and manages store inventory.

Still yet another object of the embodiments of the present invention is to eliminate the problem with barcodes in that a person using a barcode reader must scan every item one-by-one. For a typical mid-sized apparel store with hundreds of unique items, a physical inventory count becomes a big task. The RFID of the embodiments of the present invention streamlines this task so that retailers can count more often, gaining the benefits of a more accurate inventory.

Yet still another object of the embodiments of the present invention is the development of software that focuses on prevention of theft, track inventory within the optical retail outlet, and use a cloud-based-system to inform select eyeglass-manufacturers and distributors of a sale to improve restocking.

Space Available

The RFID system components will be placed inside a custom designed screw 15 that is based on "Safe-Lok™ Hinge & Eye wire Screw—Part #275015300", as shown in FIG. 4.

The measurements of the screw are as follows:
1. Head Diameter—2.0 mm;
2. Screw Diameter—1.4 mm; and
3. Screw Length—3.5 mm.

Approach

Considering the limited space for the application, a true antenna will be a complex task to devise, rather alternatively, a small loop antenna coil is devised that resonates at the frequency of interest (915 MHz). The antenna will utilize near field magnetic induction coupling between the source transmitter and the receiving antenna coil to activate the passive tag device mounted. Hence the antenna coil is designed to maximize the induced voltage, targeted read range is 30 cm.

As shown in FIG. 5, is an illustration of the design layout where the antenna coil 16 is wrapped on a highly permeable ferrite rod 17, with the PCB 18 hosting the chip 19 and the capacitor 19a.

Tag Chip Specs

The chip 19b chosen for this application is UCODE 8m ICs model SL3S1205_15. Infra, are the technical details based on the provider's datasheet.

Mechanical Details

As shown in FIG. 6:
1. Die to Die distance (metal sealring—metal sealring) 21.4 μm, (X-scribe line width: 15 μm);
2. Die to Die distance (metal sealring—metal sealring) 21.4 μm, (Y-scribe line width: 15 μm);
3. Chip step, Y-length: 490 μm;
4. Chip step, X-length: 480 μm;
5. Bump to bump distance X (RF1-RF2): 115 μm;
6. Distance bump to metal sealring Y: 23.5 μm;
7. Bump size (TP1, TP2) Y: 100 μm;
8. Bump to bump distance Y (RF1-TP2, RF2-TP1): 50 μm;
9. Bump size (RF1, RF2) Y: 278 μm;

10. Distance bump to metal sealring X: 23.5 μm;
11. Bump size (TP1, TP2) X: 134.2 μm;
12. Bump size (RF1, RF2) X: 151.5 μm; and
13. Distance bump to metal sealring Y: 441.5 μm RF Interface Characteristics All parameters and conditions listed are based on the system application of the embodiments of the present invention from SL3S1205_15 datasheet.

Parameters and Their Associated Values

1. Input Frequency is 915 MHz;
2. Minimum Input Power (Read Sensitivity) is −22.9 dBm;
3. Minimum Input Power (Write Sensitivity) is −17.8 dBm;
4. Chip Input Capacitance is 0.69 pF;
5. Chip Impedance is 14-j242 (at 915 MHz);
6. Typical Assembled Impedance is 19-j234 (at 915 MHz); and
7. Typical Assembled Impedance in case of Single-Slit Antenna Assembly is 13-j191 (at 915 MHz);

Note: It is always recommended to modify the designed antenna's physical properties as to have the antenna connected directly to the load (avoiding the use of a matching circuit). Please refer to the FIG. 7 for the work flow 19c for this attempt.

Antenna Coil Wire Selection

There are various wire sizes and wire types with different ohmic losses, attempt to select the best theoretical wire to use for our application, infra.

Electrical wire diameter is defined in terms of the American Wire Gauge (AWG) number. The gauge is inversely proportional to the diameter. A wire with an ultra small diameter which produces high DC resistance will be used.

To ensure the copper used is sufficient for a 915 MHz wave to propagate with extremely low amount of attenuation, the skin depth (the loss produced as the charge moves away from the wire's center and settling around the wires circumference) was calculated as follows:

1. Frequency—915×106 Hz;
2. Material Used—Copper;
3. Permeability of Material—4π×10-7; and
4. Conductivity of Material—5.8×10$^{-7}$.

$$\delta = \frac{1}{\sqrt{\pi\ f\ \mu\sigma}}$$

$$\delta = \frac{1}{\sqrt{\pi \times (915 \times 10^6) \times (4\pi \times 10^{-7}) \times (5.8 \times 10^7)}}$$

$$\delta = \frac{1}{457724.7669}$$

$$\delta = 2185\ \mu m$$

To calculate the wire resistance at 915 MHz due to the skin depth:

$$R_{ac} \approx \frac{1}{2\sigma\pi\delta} = (R_{DC})\frac{a}{2\delta}$$

$$R_{ac} \approx \frac{1}{2\times(5.8\times10^7)\times\pi\times(2.185\times10^{-6})}$$

$$R \approx 1.26\ m\Omega$$

Thus, we find the skin depth at 915 MHz to be 2.185 micrometers (0.002185 mm), please refer to the "Appendix" which is a AWG wire chart of this document for the list of AWG gauge wires.

From the table and putting our limited space (~1.4 mm) into considerations, a wire with a gauge number greater than #29 will be a good choice.

The inductance of a single wounded wire can be approximated as: (The wire assumed in the calculations below is gauge #29, as it is being set as the minimum requirement)

$$L = \frac{(aN)^2}{22.9a + 25.4l}(\mu H)$$

$$L = \frac{(0.02859\times 9)^2}{(22.9\times 0.02859) + (25.4\times 0.28)}$$

$$L = \frac{0.0662}{7.7667}$$

$$L = 8.524\ nH$$

The IC datasheet indicates the chip input capacitance condition to be a parallel connection.

To achieve the maximum possible energy transfer, the antenna and components must be in resonance that occurs when the inductance reactance and the capacitances are about equal.

The capacitive reactance can be calculated as (the capacitance value C is provided by the chip datasheet and referred to in RF interface Characteristics, supra):

$$X_C = \frac{1}{2\pi fC}$$

$$X_C = \frac{1}{2\times\pi\times 915\times 10^6 \times 0.69\times 10^{-12}}$$

$$X_C = 252.0867$$

The inductive reactance is calculated as:

$$X_L = 2\pi fL$$

$$X_L = 2\times\pi x(915\times 10^6)\times(8.524\times 10^{-9})$$

$$X_L = 49.0054$$

$$X_L = X_C$$

$$2\pi fL = 252.0867$$

$$L = \frac{252.0867}{2\times\pi x(915\times 10^6)}$$

$$L = 4.39\times 10^{-8} H$$

The inductive reactance is much less than the capacitance. The two equations will be equated to find the best inductance.

The inductance required is 43.9 nH, to avoid additional component usage the antenna was physically modified other than adding a matching circuit as follows:

1. Wire Used—AWG #36 (Diameter of wire without insulation 0.127 mm);
2. Diameter of Ferrite Rod—0.8 mm;
3. Length of Winding—2.8 mm;
4. Number of Turns—9;
5. Number of Layers—1;
6. Winding Thickness—0.127 mm;
7. Required Length of Wire—2.621 mm;
8. DC Resistance of Coil—0.04 Ohm.

FIG. 8 shows occupied space 19d of the antenna coil 16 based on the calculations:

To verify the resonance frequency of the circuit for the calculated inductance and tuning capacitance used for the tag:

$$f_o = \frac{1}{2\pi\sqrt{LC}}$$

$$f_o = \frac{1}{2\times\pi\times\sqrt{(43.9\times10^{-9})\times(0.69\times10^{-12})}}$$

$$f_o = 914457078.8 \text{ Hz}$$

$$f_o = 914.46 \text{ Mhz}$$

It can be seen that rounding roughly raises a 0.059% error margin from 915 MHz. Hence we can proceed with these values.

From the datasheet of the IC, the minimum write cycle endurance is 100 k cycles (100 KHz).

Thus, the bandwidth needs at least twice of the data rate. The Q factor can be obtained as:

$$Q_{max} = \frac{f_o}{B}$$

$$Q_{max} = \frac{915\times10^6}{200\times10^3}$$

$$Q_{max} = 4575$$

The embodiments of the present invention themselves, however, both as to their construction and to their method of operation, together with additional objects and advantages thereof, will be best understood from the following description of the embodiments of the present invention when read and understood in connection with the accompanying figures of the drawing.

BRIEF DESCRIPTION OF THE FIGURES OF THE DRAWING

FIG. 12 is an enlarged diagrammatic side elevational view of the RFID tag of the embodiments of the present invention.

LIST OF REFERENCE NUMERALS UTILIZED IN FIGURES OF DRAWING

Figure 1:
FIG. 1 is a diagrammatic perspective view of an example of a single prior art tag.
Figure 2:
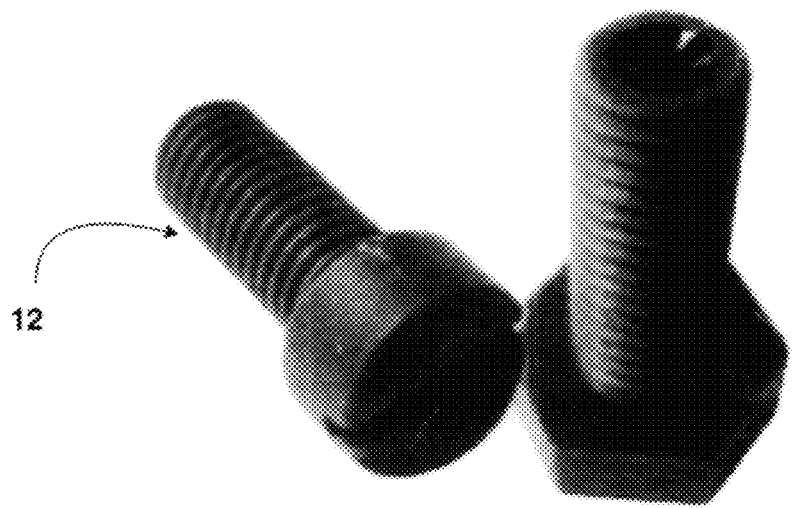
FIG. 2 is a diagrammatic perspective view of an example of a pair of prior art tags.
Figure 3:
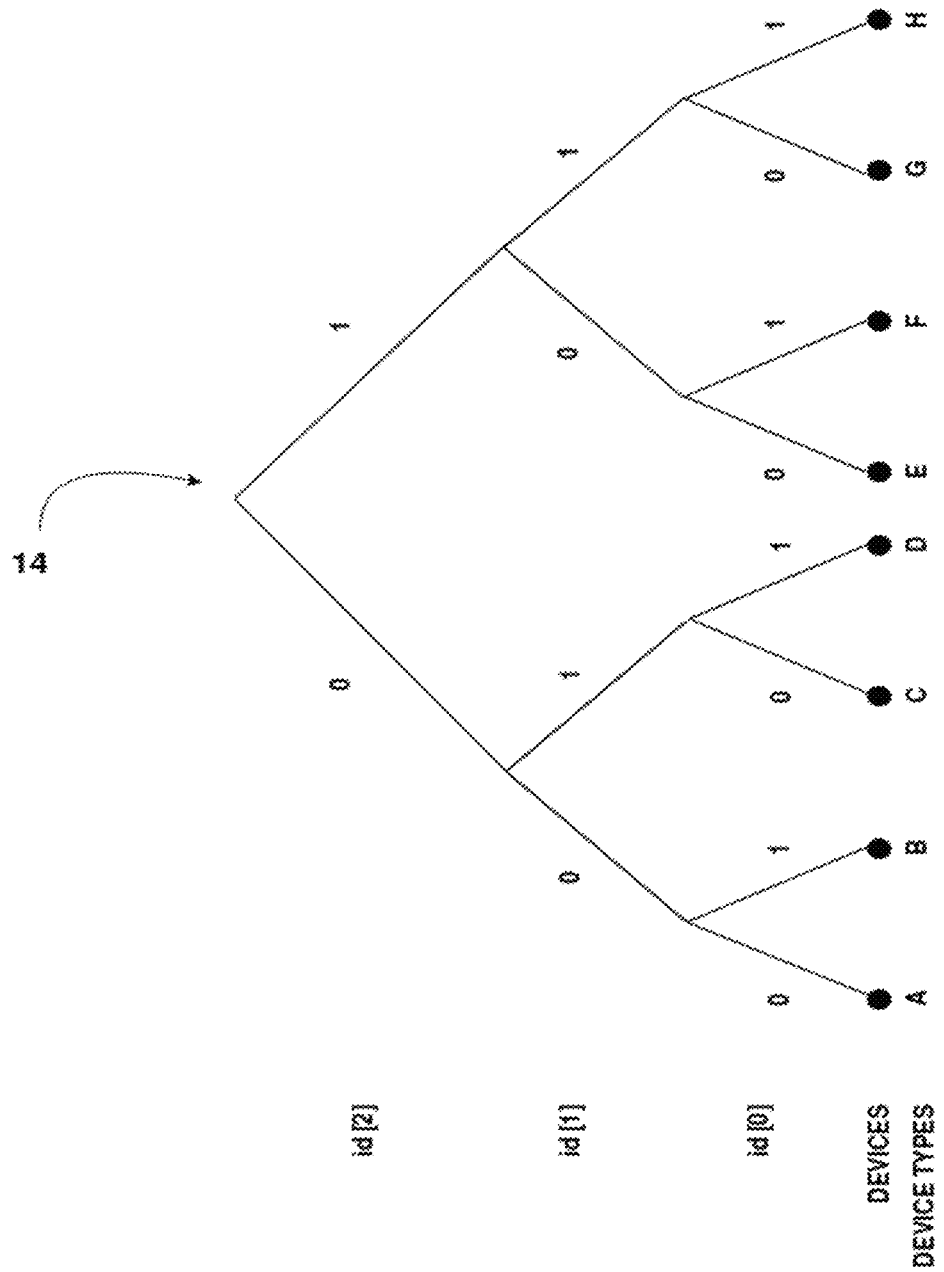
FIG. 3 is a diagrammatic example of a binary tree method of identifying an RFID tag.
Figure 4:
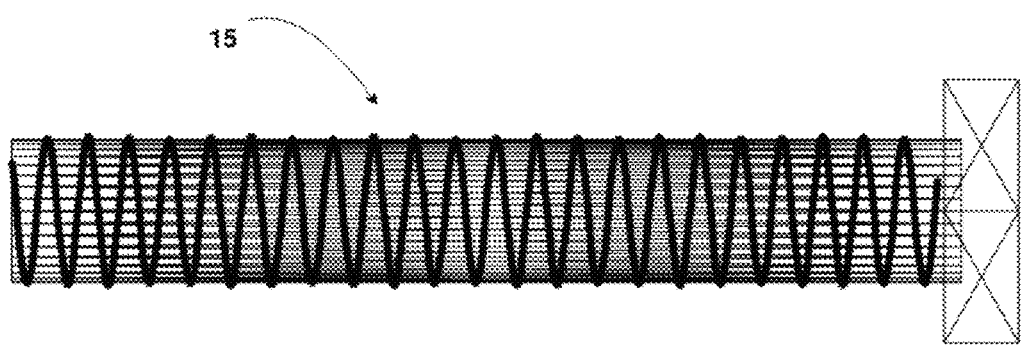
FIG. 4 is a diagrammatic side elevational view of an Eye wire screw—Part #275015300.
Figure 5:
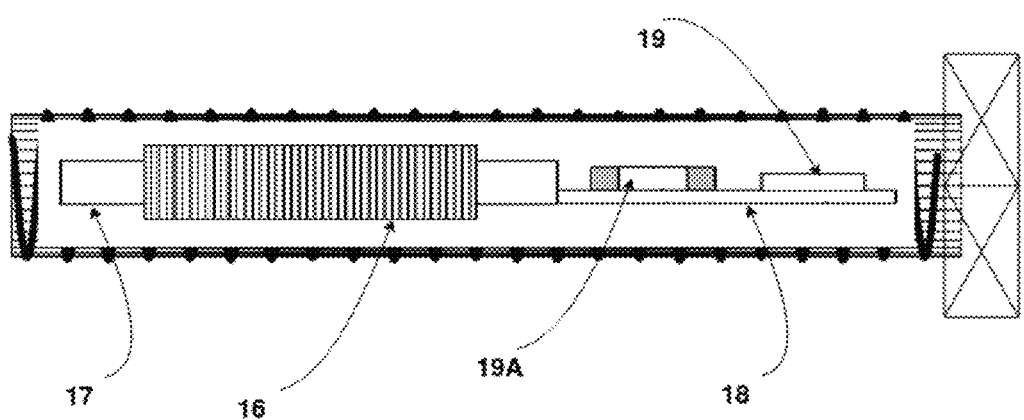
FIG. 5 is a diagrammatic illustration of the design layout where the antenna coil is wrapped on a highly permeable ferrite rid, with the PCB hosting the chip and the capacitor.
Figure 6:
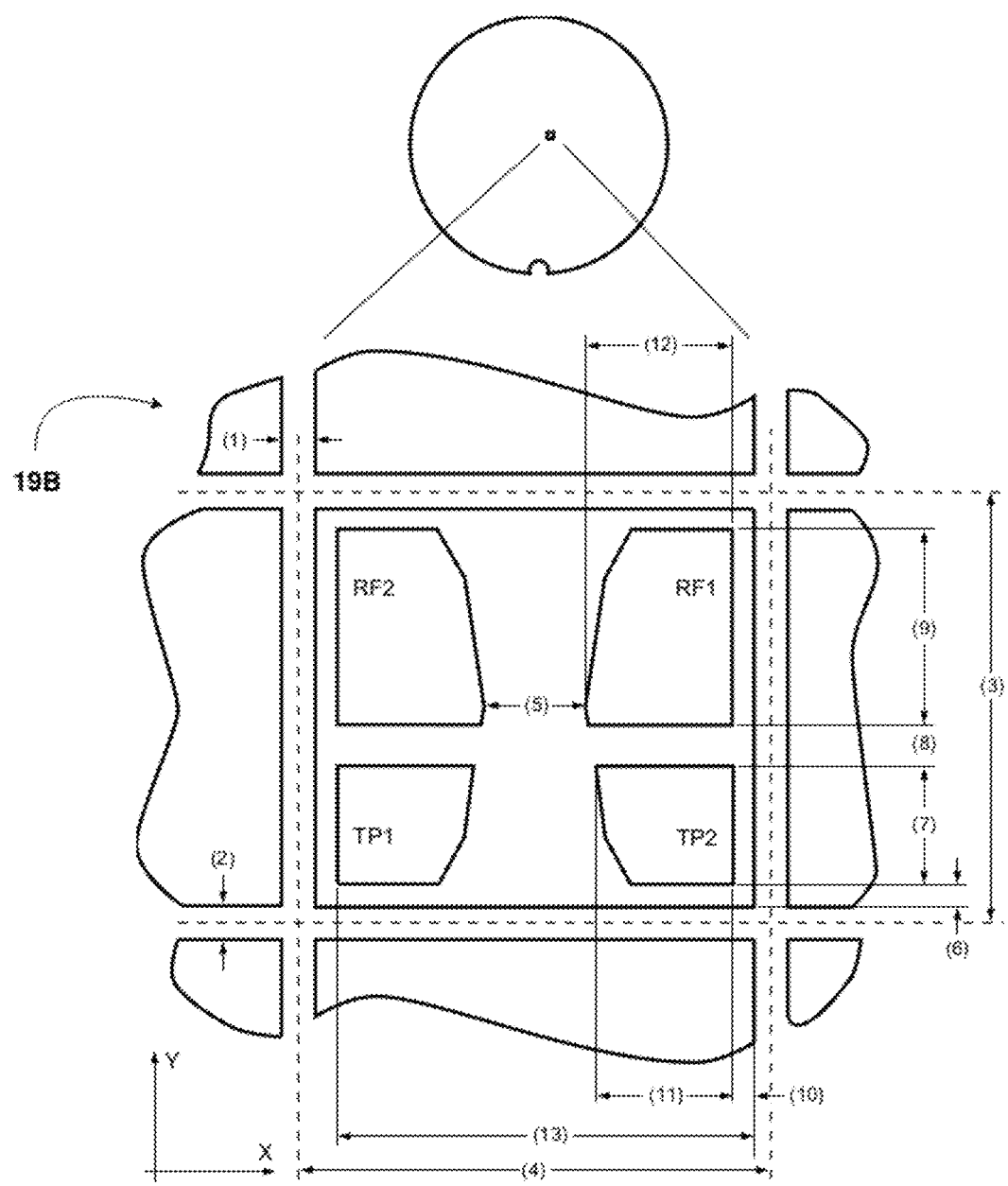
FIG. 6 is a diagrammatic top plan view of the mechanical details if the RFID tag.
Figure 7:
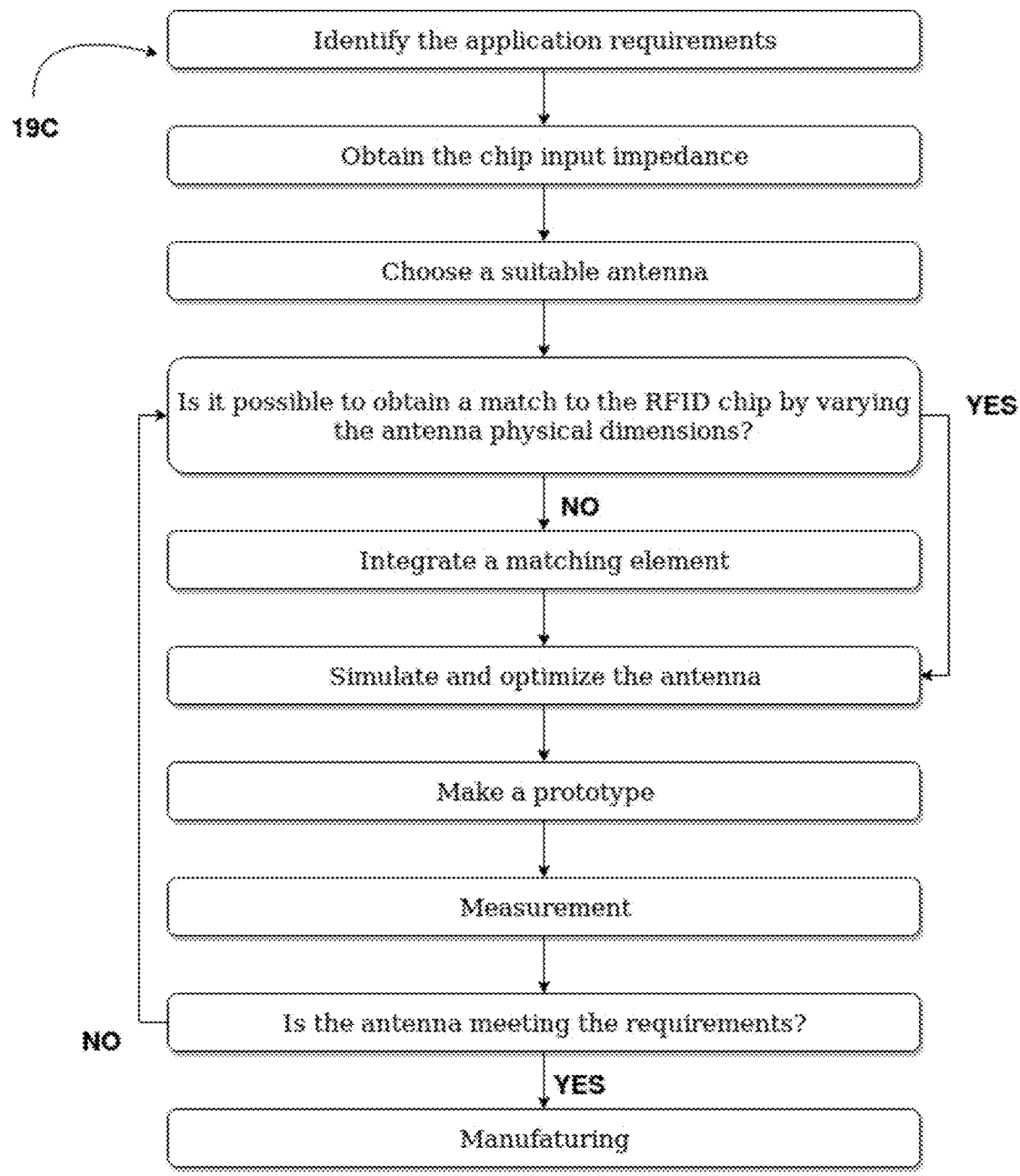
FIG. 7 is a diagrammatic flow chart for modifying the designed antenna's physical properties as to have the antenna connected directly to the load avoiding the use of a matching circuit.
Figure 8:
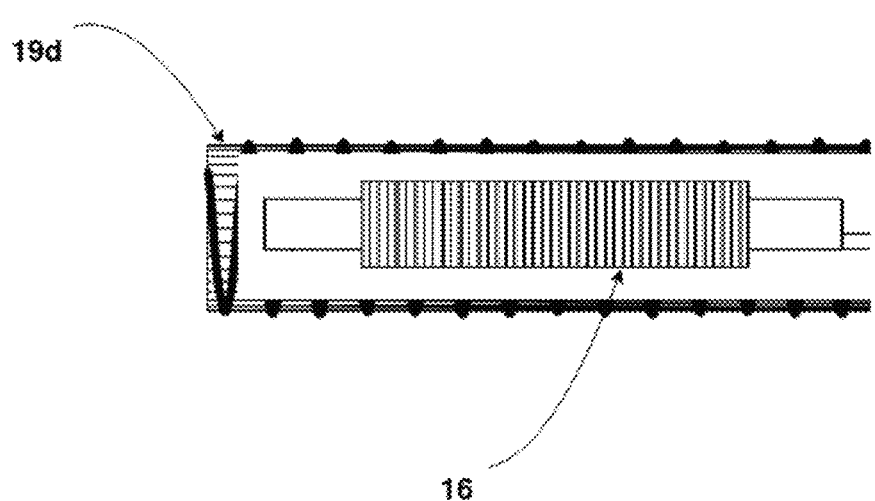
FIG. 8 is a diagrammatic top plan view showing the occupied space of the antenna coil based on relevant calculations.

Prior Art 10 examples of prior art RFID tags
12 other examples of prior art RFID tags
14 binary tree method of identifying an RFID tag

SUMMARY OF INVENTION

Space Available 15 custom designed screw

Approach 16 antenna coil
17 highly permeable ferrite rod
18 PCB
19 chip
19a capacitor Tag Chip Specs 19b chip Parameters and Their Associated Values 19c workflow Antenna Coil Wire Selection 19d occupied space of antenna coil 16

DETAILED DESCRIPTION OF PREFERRED EMBODIMENTS

Introductory

20 RFID screw of embodiments of present invention specifically for use on eyeglass frames 22
22 eyeglass frames Pertinent Parts of Eyeglass Frame 22

24 pair of eye wires or rims
26 pair of lenses 28 front frame
30 pair of end pieces
32 pair of hinges
34 pair of temples Configuration of RFID Tag 20

36 integrated circuit for storing and processing information that modulates and demodulates radio-frequency (RF) signals
38 means of collecting DC power from incident reader signal
40 antenna for receiving and transmitting signal
42 non-volatile memory
44 fixed or programmable logic for processing transmission and sensor data, respectively

DETAILED DESCRIPTION OF THE PREFERRED EMBODIMENTS

Introductory

Figure 9:
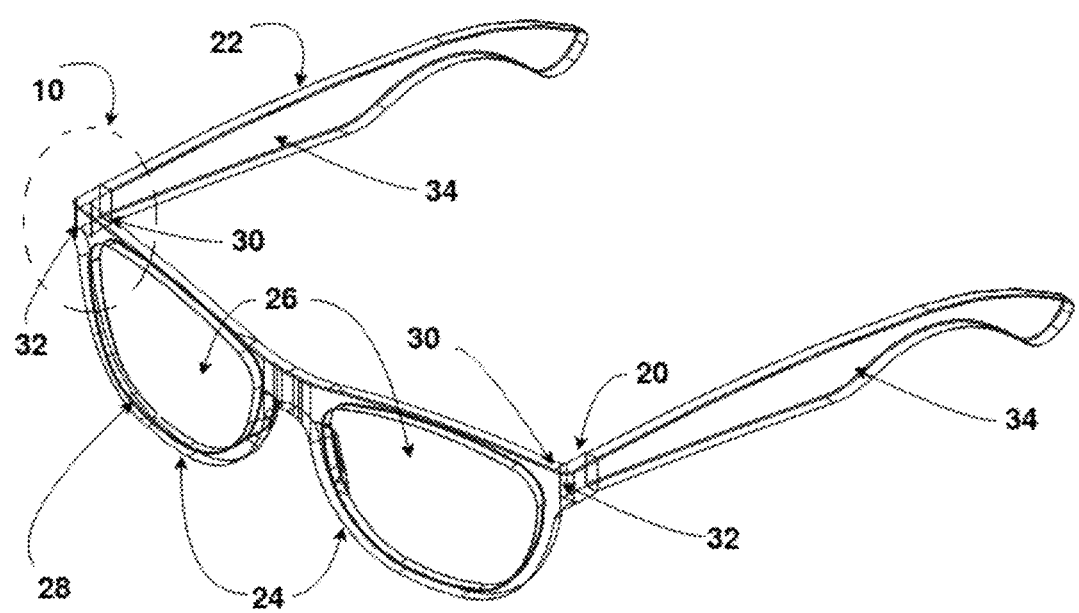
FIG. 9 is a diagrammatic perspective view of a pair of glasses utilizing the RFID tag of the embodiments of the present invention.
Figure 10:
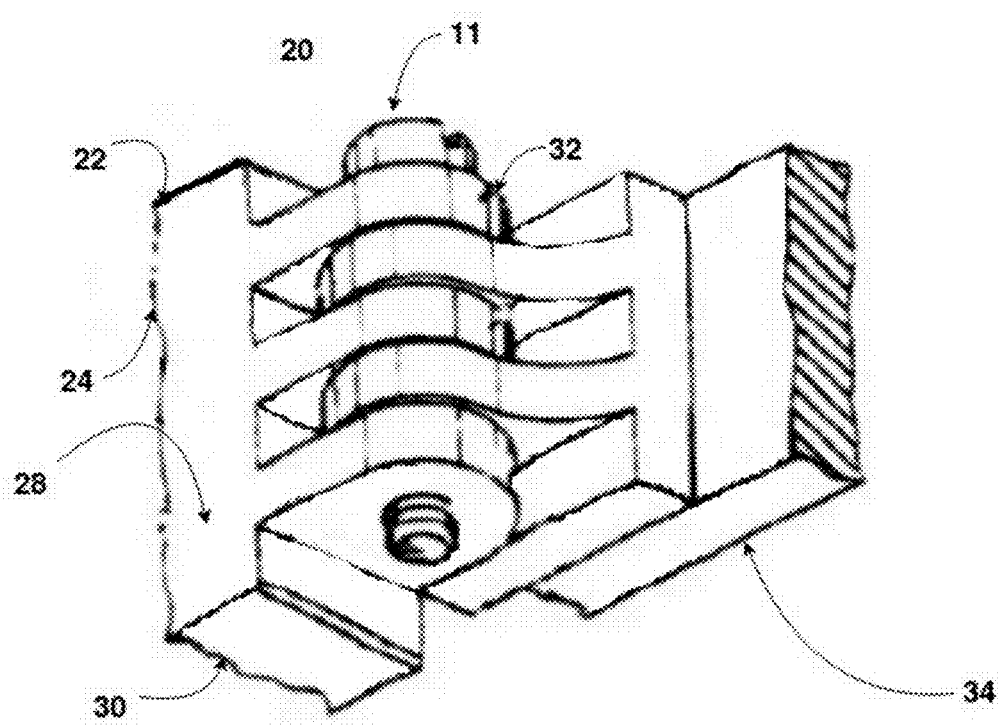
FIG. 10 is an enlarged diagrammatic perspective view of the area generally enclosed by the dotted curve identified by ARROW 10 in FIG. 9 of the hinge of the pair of glasses shown in FIG. 9.
Figure 11:
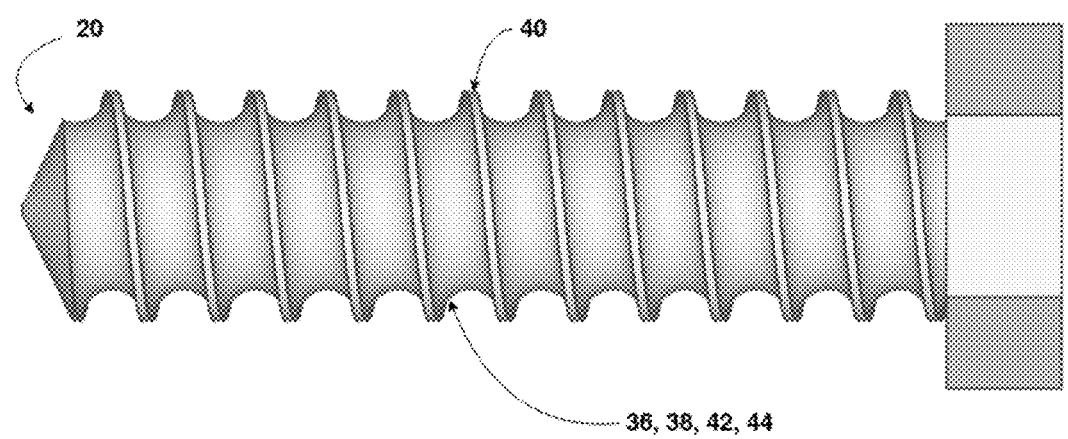
FIG. 11 is an enlarged diagrammatic side elevational view of the RFID tag of the embodiments of the present invention.

Referring now to the other figures, in which like numerals indicate like parts, and particularly to FIGS. 9 to 11, the RFID screw of the embodiments of the present invention is shown generally at 20, specifically, for use on eyeglass frames 22.

Pertinent Parts of the Eyeglass Frame 22

The pertinent parts of the eyeglass frame 22 can best be seen in FIGS. 9 and 10, and as such, will be discussed with reference thereto.
The pertinent parts of the eyeglass frame 22 include:
A pair of eye wires or rims 24 surrounding and holding a pair of lenses 26 in place in a front frame 28;
A pair of end pieces 30 that connect the pair of eye wires or rims 24, respectively, via a pair of hinges 32, respectively, to a pair of temples 34, respectively;
The pair of hinges 32 connecting the pair of end pieces 30 of the front frame 28 to the pair of temple/eye pieces 34, respectively, allow a pivoting movement of the pair of temples 34, with a pair of RFID screws of the embodiments of the present invention being a pair of hinge pins thereof, respectively; and
The pair of temple/eye pieces 34 on either side of the skull, respectively, pivotally attached to the pair of end pieces 30, respectively, by the pair of hinges 32, respectively.

Configuration of the RFID Tag 20

The configuration of the RFID tag 20 can best be seen in FIG. 11, and as such, will be discussed with reference thereto.
The RFID tag 20 comprises an integrated circuit 36 for storing and processing information that modulates and demodulates radio-frequency (RF) signals, apparatus 38 for collecting the AC power signal from an incident reader signal, and an antenna 40 for receiving and transmitting the signal. The RFID tag 20 information is stored in a non-volatile memory 42.
The RFID tag 20 includes either fixed or programmable logic 44 for processing the transmission and sensor data, respectively.
In order to have read/write ability, the RFID tag 20 uses a class 2 gen IC (the SL3S12-5-15-DS IC) to embed the RFID tag 20 into a screw shape. Said antenna is embedded or placed inside said screw and is a coil design approach.
The RFID tag 20 is made of one of high end plastic and silver ink.
The coil antenna 40 utilizes near field magnetic induction coupling at 915 MHz, with the integrated circuit 36 being SL3S1205_15.
Total diameter occupied by the coil antenna 40, including a conductive rod hosting the coil, is roughly 1.054 mm. 0.346 mm space is left in consideration of thickness for the screw enclosure. To adapt to the limited space, an insulated coil occupies more space so the coil antenna 40 is made from bare wire and uses the hard plastic body for the screw to avoid any interference a metal body will cause.
The reason why it is imperative to have the RFID embedded or even shaped as a mini eyeglass screw is the inventory and transportation process can be tracked from the manufacturing to the distribution to the retail inventory (including tracking of theft), and then when a sale is made in which case the information will then be sent back to the manufacturer/distributor. This allows all the manufacturers of frames to participate, whereas the patch or RFID wrap around the frame will only be supported by a small number of manufacturers and retailers. The one thing all frame manufacturers use are the mini screws. It would be a large disadvantage to get manufacturers to change the way they are already producing frames for them to add an additional component to the frame, such as, the RFID wrap.
Hitachi—the Japanese semiconductor company—has unveiled a prototype for the next generation of its μ-Chip (pronounced mu-chip). The chip is just 0.3 millimeters square.
Murata's RFID tag measures only 1.25×1.25×0.55 mm and incorporates a high-powered antenna into the multilayer ceramic substrate. This is a perfect size for a frame screw with the widest part of the screw head being just less than 1.30 mm.

Impressions

It will be understood that each of the elements described above, or two or more together, may also find a useful application in other types of constructions differing from the types described above.
While the embodiments of the present invention have been illustrated and described as embodied in a RFID screw specifically for use on eyeglass frames, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.
Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.
What is claimed is:
1. An RFID tag for use on eyeglass frames, wherein the eyeglass frame includes a pair of eye wires or rims surrounding and holding a pair of lenses in place in a front frame, a pair of end pieces that connect the pair of eye wires or rims, respectively, via a pair of hinges, respectively, to a pair of temples, respectively, wherein the pair of hinges connecting the pair of end pieces of the front frame to the pair of temple/eye pieces, respectively, allow a pivoting movement of the pair of temples with a pair of RFID screws being a pair of hinge pins thereof, respectively, wherein the pair of temple/eye pieces on either side of the skull, respectively, are pivotally attached to the pair of end pieces, respectively, by the pair of hinges, respectively, and wherein said RFID tag comprising:

a) an integrated circuit for storing and processing information that modulates and demodulates radio-frequency (RF) signals;
   b) means for collecting DC power from an incident reader signal; and
   c) an antenna for receiving and transmitting the signal so as to form a transmission;
   wherein information from said RFID tag is stored in a non-volatile memory;
   wherein either fixed or programmable logic processes transmission and sensor data, respectively;
   wherein in order to have read/write ability, said RFID tag uses a class 2 gen IC to embed the RFID tag into a screw shape; and
   wherein essentially, said antenna is shaped as said screw and is a coil design approach.

2. The RFID tag of claim 1, wherein said RFID tag is made of one of high end plastic and silver ink.

3. The RFID tag of claim 1, wherein said coil antenna utilizes near field magnetic induction coupling at 915 MHz.

4. The RFID tag of claim 1, wherein total diameter occupied by said coil antenna, including a conductive rod hosting the coil, is roughly 1.054 mm;
   wherein 0.346 mm space is left in consideration of thickness for a screw enclosure; and
   wherein to adapt to limited space, an insulated coil occupies more space so said coil antenna is made from bare wire and uses a hard plastic body for the screw to avoid any interference a metal body causes.

5. The RFID tag of claim 1, wherein said RFID tag measures only 1.25×1.25×0.55 mm and incorporates said high-powered antenna into a multi-layer ceramic substrate; and
   wherein a widest part of a screw head is just less than 1.30 mm.

* * * * *